US011428806B2

(12) United States Patent
Weiner et al.

(10) Patent No.: US 11,428,806 B2
(45) Date of Patent: Aug. 30, 2022

(54) COMMUNICATIONS SYSTEM HAVING INTERFERENCE MITIGATION FOR NON-GEOSTATIONARY WEATHER SATELLITE AND ASSOCIATED METHOD

(71) Applicant: EAGLE TECHNOLOGY, LLC, Melbourne, FL (US)

(72) Inventors: Allan M. Weiner, Melbourne, FL (US); Brian J. Haman, Melbourne, FL (US); Jahmar P. Ignacio, West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 668 days.

(21) Appl. No.: 16/459,663

(22) Filed: Jul. 2, 2019

(65) Prior Publication Data
US 2021/0003702 A1 Jan. 7, 2021

(51) Int. Cl.
*G01S 13/95* (2006.01)
*B64G 1/10* (2006.01)
(Continued)

(52) U.S. Cl.
CPC .......... *G01S 13/955* (2013.01); *B64G 1/105* (2013.01); *G01S 19/425* (2013.01);
(Continued)

(58) Field of Classification Search
CPC .............. H04B 7/18513; H04W 16/14; H04W 52/244; G01S 13/955; G01S 19/425; B64G 1/105; B64G 2001/1042
See application file for complete search history.

(56) References Cited

U.S. PATENT DOCUMENTS 5,894,590 A * 4/1999 Vatt ...................... B64G 1/1085
455/430
6,999,720 B2 * 2/2006 Karabinis .............. H04B 7/216
455/12.1
(Continued)

FOREIGN PATENT DOCUMENTS

WO         9726717         7/1997

OTHER PUBLICATIONS

"Northrop Grumman-Built ATMS and CERES Instruments Successfully Supporting NOAA Weather Satellite", Northrop Grumman Newsroom (Year: 2018).*
(Continued)

*Primary Examiner* — Raymond S Dean
(74) *Attorney, Agent, or Firm* — Allen, Dyer, Doppelt + Gilchrist, P.A.

(57) ABSTRACT

A communications system includes cellular devices and cellular base stations in communication with the cellular devices in a first frequency band. A non-geostationary satellite may include sensing circuitry operable in a second frequency band susceptible to interference from the first frequency band. Each cellular base station may include a controller and a transceiver cooperating therewith. The controller may be configured to store satellite path data for the non-geostationary satellite, determine when the satellite path data indicates interference would otherwise be experienced by the non-geostationary satellite, and implement an interference mitigation action in cooperation with associated cellular devices based upon the satellite path data indicating interference would otherwise be experienced by the non-geostationary satellite.

25 Claims, 3 Drawing Sheets

(51) Int. Cl.
G01S 19/42 (2010.01)
H04B 7/185 (2006.01)
H04W 52/24 (2009.01)
H04W 16/14 (2009.01)

(52) U.S. Cl.
CPC ........ *H04B 7/18513* (2013.01); *H04W 16/14* (2013.01); *H04W 52/244* (2013.01); *B64G 2001/1042* (2013.01)

(56) References Cited

U.S. PATENT DOCUMENTS

| | | | |
|---|---|---|---|
| 7,599,656 B2* | 10/2009 | Karabinis | H04B 7/18543 455/12.1 |
| 2012/0214524 A1* | 8/2012 | Wajcer | H04B 7/0845 455/502 |
| 2013/0315112 A1* | 11/2013 | Gormley | H04B 7/18539 370/280 |
| 2018/0103381 A1* | 4/2018 | Ramamurthi | H04W 36/0016 |
| 2018/0269999 A1* | 9/2018 | Budyta | H04B 7/18517 |
| 2020/0374976 A1* | 11/2020 | Dutta | H04W 84/18 |
| 2020/0408601 A1* | 12/2020 | Sasagawa | G08B 17/005 |

OTHER PUBLICATIONS

Samenow, "Head of NOAA says 5G deployment could set weather forecasts back 40 years. The wireless industry denies it", The Washington Post, May 2019, pp. 1-3.

* cited by examiner

COMMUNICATIONS SYSTEM HAVING INTERFERENCE MITIGATION FOR NON-GEOSTATIONARY WEATHER SATELLITE AND ASSOCIATED METHOD

FIELD OF THE INVENTION

The present invention relates to communications systems, and, more particularly, to mitigating interference from cellular devices with non-geostationary weather satellites and related methods.

BACKGROUND OF THE INVENTION

Weather satellites include meteorological sensing circuitry that senses atmospheric and related data for forecasting the weather, such as conducted by the National Oceanic and Atmospheric Administration (NOAA). Weather satellite data is based on a global view of the Earth and complements land-based systems, e.g., radiosondes, weather radars, and surface observing systems. Two types of satellites are typically used for weather forecasting, i.e., geostationary satellites and Low Earth Orbiting (LEO) satellites. Geostationary satellites are in orbit about 22,000 miles above the equator and spin at the same rate of the Earth and constantly focus on the same area. This enables a geostationary weather satellite to take a picture of the Earth, at the same location, every 5 to 15 minutes, in effect, creating a loop of the data that forecasters use as the real-time "bird's eye view" of the Earth. LEO orbiting weather satellites are non-geostationary satellites in a much lower orbit. When acting as a polar LEO satellite, it has a north-south orbit and observe the same spot on the Earth twice daily, once during the daylight and once at night. Polar orbiting satellites provide imagery and atmospheric soundings of temperature and moisture data and other data over the entire Earth. Examples of polar orbiting satellites include the Polar Operational Environmental Satellite (POES) and the Joint Polar Satellite System (JPSS).

Polar orbiting satellites usually carry a suite of sensors that collect meteorological, oceanographic, climatological and solar-geophysical observations of the Earth, land, oceans, atmosphere, and near-Earth space. Example sensors include a Visible Infrared Imaging Radiometer Suite (VIIRS) instrument and the combination Advanced Technology Microwave Sounder (ATMS)/Cross-track Infrared Sounder (CrIS) instruments carried on the JPSS satellite. The ATMS instrument is a scanner with 22 channels and provides sounding observations to retrieve profiles of atmospheric temperature and moisture as well as other meteorological data. The ATMS instrument operates as a spectral, 22-channel sounder, having a microwave receiver at each channel, allowing the ATMS instrument to operate at different frequencies ranging from 23.8 GHz to 183.3 GHz.

The increasing worldwide demand for cell phone bandwidth, however, has created potential interference issues to some ATMS instrument channels. For example, additional bandwidth close to some frequencies used by the ATMS instrument has been allocated to cellular service providers for use in their future fifth generation (5G) cellular phone service. One 5G band is the 24 GHz band, which is close to the atmospheric water vapor band emission at 23.8 GHz, corresponding to channel 1 in the ATMS instrument to sense water vapor in the atmosphere. Other potential 5G frequencies are close to or overlap the frequencies used in other channels of the ATMS instrument. This interference from 5G cellular devices may create sensor interference on these satellites and may degrade the National Weather Service predictions and forecasts. Non-geostationary satellites operated by other countries also sense data at similar frequencies operated by the ATMS instrument, including the 23.8 GHz band.

Approaches to mitigate potential interference from 5G cellular devices have been proposed, but may not be considered practical. It is possible for the National Oceanic and Atmospheric Administration (NOAA) to take no action and accept the possibility of degraded remote sensing. Allowing the potential for interference to occur, however, may not be an acceptable option to the NOAA, since any potential interference may degrade potential meteorological observations and weather forecasts. It may not be technically feasible to modify the sensors of the ATMS instrument to use different frequency bands since the molecular vibration, stretching, and other physical parameters related to the atmospheric molecular energies are sensed at those specific frequencies.

It may be possible to remove interference artifacts on the ground, but the 5G transmission power may be more than four orders of magnitude greater than the atmospheric water vapor emission energy, and the technical requirements to mask the 5G transmissions are complicated and expensive. Deleting any 5G frequency permissions, such as the 24 GHz band, may not be acceptable since many nations and companies are beginning to implement 5G systems and those nations and companies typically demand all available bandwidth. Even reducing the 5G allowable transmission power to a constant lower worldwide value may not be acceptable since many nations and carriers already recommend and may demand higher 5G power levels.

SUMMARY OF THE INVENTION

In general, a communications system may include a plurality of cellular devices and a plurality of cellular base stations in communication with the plurality of cellular devices in a first frequency band. A non-geostationary satellite may include sensing circuitry operable in a second frequency band susceptible to interference from the first frequency band. Each cellular base station may include a controller and a transceiver cooperating therewith. The controller is configured to store satellite path data for the non-geostationary satellite, determine when the satellite path data indicates interference would otherwise be experienced by the non-geostationary satellite, and implement an interference mitigation action in cooperation with associated cellular devices based upon the satellite path data indicating interference would otherwise be experienced by the non-geostationary satellite.

The controller may implement a mitigation action that may comprise causing a reduction of a transmit power of the associated cellular devices. The mitigation action may comprise causing a frequency change of the associated cellular devices. The mitigation action may also comprise causing a change of the associated cellular devices to an earlier generation of cellular technology. The controller may implement a mitigation action that is further based upon a geographic density of the associated cellular devices. The controller may also implement a mitigation action that is further based upon a time of day.

In some embodiments, the sensing circuitry of the non-geostationary satellite may comprise meteorological sensing circuitry. The first frequency band may be between 24.25 to 24.45 GHz. The second frequency band may have a center frequency of 23.8 GHz and a total bandwidth of 0.27 GHz.

Another aspect is directed to a method for operating a cellular base station that may comprise a cellular base station controller and a transceiver cooperating therewith and within a communications system that may comprise associated cellular devices. The method may comprise operating the cellular base station controller to store satellite path data for a non-geostationary satellite comprising sensing circuitry operable in a second frequency band susceptible to interference from the first frequency band, determine when the satellite path data indicates interference would otherwise be experienced by the non-geostationary satellite, and implement an interference mitigation action in cooperation with associated cellular devices based upon the satellite path data indicating interference would otherwise be experienced by the non-geostationary satellite.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
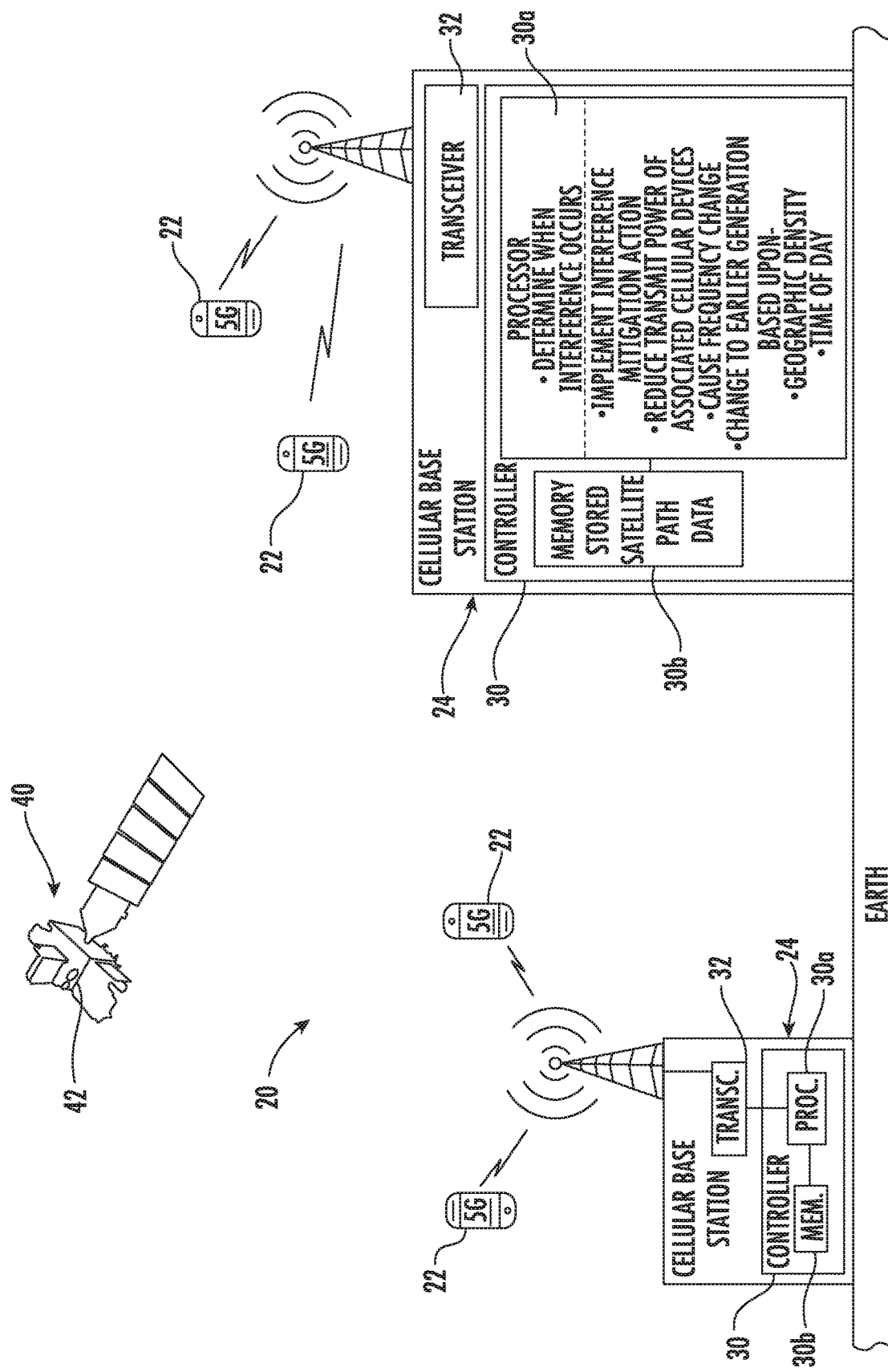
FIG. 1 is a general environmental view of the communications system showing a plurality of cellular devices, cellular base stations, and a non-geostationary weather satellite.

Referring initially to FIG. 1, a communication system is illustrated generally at 20 and includes a plurality of cellular devices 22 and a plurality of cellular base stations 24 in communication with the plurality of cellular devices and operating in a first frequency band. Each cellular base station 24 includes a controller 30 and a transceiver 32 cooperating therewith. Each controller 30 includes a processor 30a and memory 30b cooperating therewith.

A non-geostationary satellite 40 operates as a weather satellite and includes meteorological sensing circuitry 42 operable in a second frequency band that is susceptible to interference from the first frequency band operated by the cellular devices 22 and cellular base stations 24. In this example, the non-geostationary satellite 40 is a polar orbiting satellite, such as the Joint Polar Satellite System (JPSS) that includes numerous sensing devices as part of the meteorological sensing circuit 42, including the combination Advanced Technology Microwave Sounder (ATMS)/Cross-track Infrared Sounder (CrIS) instruments that operate as a cross-track microwave sounder and radiometer and measures atmospheric temperature, moisture, and other data across wide frequency bands. The ATMS instrument is operable in 22 frequency bands, each band having a microwave receiver. For example, the first channel band for the ATMS instrument has a center frequency at 23.8 GHz, corresponding to the energy band to sense atmospheric water vapor. This first band at that 23.8 GHz center frequency has a total bandwidth of about 0.27 GHz.

Under the new frequency allotment currently under development for the 5G cellular system, the cellular base station 24 and plurality of cellular devices 22 are operable in a first frequency band, such as the 24.25 to 24.45 GHz, and the 24.75 to 25.5 GHz frequency spectrum, which is especially adapted for use with 5G cellular devices. This 24 GHz, 5G frequency band operating at 24.25 to 24.45 GHz and 24.75 to 25.5 GHz is close to the 23.8 GHz atmospheric water vapor band emission sensed by the ATMS instrument operating on its channel one as part of the meteorological sensing circuitry 42. It is possible that the 5G signal transmissions within the allotted 24 GHz 5G frequency band may produce artifacts that interfere with the remotely sensed atmospheric water vapor emissions. The ATMS instrument as part of the meteorological sensing circuitry 42 also operates at other frequencies, corresponding to other frequency channels that may receive interference from 5G cellular devices 22. Possible interference from other allotted 5G frequencies with those ATMS sensor bands include interference with the ATMS channel 2 having a center frequency of 31.4 GHz and a total bandwidth of about 0.18 GHz, corresponding to the frequencies used for cloud physics and precipitation measurements. There may be possible interference with ATMS channel 3 having a center frequency of 50.3 GHz and a bandwidth of about 0.18 GHz, corresponding to the frequencies used for temperature sounding. Potential interfering 5G frequencies include allotted 5G frequencies below 50.2 GHz and above 50.4 GHz. One proposed 5G allotted frequency is in the middle of ATMS channel 4 operating at 51.76 GHz and having a bandwidth of about 0.4 GHz, and in ATMS channel 6 at 53.6 GHz. Other ATMS channels that operate at upper frequencies also could have possible interference from 5G cellular devices 22, including channel 16 at a center frequency of 88.2 GHz and having a bandwidth of about 2.0 GHz.

According to the World Meteorological Organization (WMO), Observing Systems Capability Analysis and Review (OSCAR) tool, there are more than 50 satellites in use already planned with observation frequencies above 20 GHz. Some of these bands are directly in the recommended 5G bands. The International Telecommunications Union (ITU) for 5G International Mobile Telecommunications (IMT) systems has recommended 5G providers around the world use many other bands as the IMT 2020. Different bands are recommended for 5G use, including: 24.5-27.5 GHz; 37-40.5 GHz; 42.5-43.5 GHz; 47.2-50.2 GHz; 50.4-52.6 GHz; 66-76 GHz; and 81-86 GHz. Besides the 23.8 GHz indicated above and the other bands, other frequencies used by satellites that could have interference from 5G cellular devices include: 31.4 GHz, 50.3 GHz, 52.8 GHz, and 53.481 to 53.711 GHz. There are a number of other frequencies used by the various sensors closely related to these frequencies.

Several mitigation strategies have been proposed to reduce the potential interference from 5G cellular devices 22 to different ATMS operating frequencies. For example, one proposal is to take no action and accept any degradation to the ATMS instrument remote sensing due to 5G device interference. In some cases, possible sensor degradation may have an effect on subsequent weather forecasts. For that reason, the NOAA has not found that proposal acceptable. It has been proposed to modify the ATMS instrument sensors to use different frequency bands. That proposal is not a physical possibility since the vibration, stretching and other physical aspects of the molecular energy involved with sensing in the specific ATMS instrument frequency bands requires the ATMS instrument sensors to work at their specific frequencies. The existing ATMS frequency bands are especially adapted to sensing specific atmospheric conditions.

A proposal to remove interference artifacts may be technically challenging. For example, the 5G transmission power is more than four orders of magnitude greater than the energy associated with atmospheric water vapor emission. The mathematics and cost of implementing the required filters may be cost prohibitive in some cases.

It is possible to cancel the 5G frequency allotments corresponding to the potentially interfering 5G frequencies, but many countries and carriers request these allotted frequencies as part of their 5G cellular systems. Reducing the allowable transmission power to an agreed upon worldwide value is difficult because different carriers and countries have different technical requirements and allow higher limits on 5G transmissions.

In a current embodiment, each cellular base station 24 includes a controller 30 and transceiver 32 as noted before and cooperates with each other. Each controller 30 is configured to store in its memory 30b satellite path data for the non-geostationary satellite 40. The processor 30a within each controller 30 determines when the satellite path data indicates the satellite 40 is passing overhead and interference from 5G cellular devices 22 would be experienced by the satellite. The ephemeris of polar orbiting satellites, such as the JPSS satellite 40, is well known, and by maintaining current satellite trajectory data in memory 30b, the controller 30 at the cellular base station 24 will calculate when the satellite passes over and take any appropriate interference mitigation action. The controller 30 may implement an interference mitigation action in cooperation with the associated cellular devices 22 based upon the stored satellite path data, indicating interference would otherwise be experienced by the non-geostationary satellite 40, in this example, a JPSS satellite having an ATMS instrument as part of its meteorological sensing circuitry 42. The software for this type of control does not have to be in the controller 30, but can be external to the base station 24 and the data sent to the base station, where the controller then initiates action.

The interference mitigation action may include having the cellular base station 24 generate and transmit an instruction causing a reduction of the transmit power of the associated cellular devices 22, or causing a frequency change of the associated cellular devices. Another mitigation action could cause the associated cellular devices 22 to operate at an earlier generation of cellular technology, for example, switching operating parameters in each cellular device 22 to operate in a 4G technology from 5G technology. In still another mitigation action, the controller 30 may implement the mitigation action based upon a geographic density of the associated cellular devices 22, and in yet another example, based on time of day.

Each cellular base station 24 may command the cellular devices 22 to turn off their 5G signals or reduce the signal strength associated with each cellular device to a non-interference level capability as the non-geostationary satellite 40 having its meteorological sensing circuitry 42, such as its ATMS instrument, passes overhead. The ephemeris or trajectory of this non-geostationary satellite 40 is well known and stored in the memory 30b of each base station controller 30, and the processor 30a calculates the timetable required to turn 5G cellular devices 22 on and off, or process the time periods for reducing their power and by how much.

It is also possible to have the cellular base stations 24 command the cellular devices 22 to switch to a previous generation 4G mode. Users of such cellular devices 22 may notice a slower link for only a few seconds. The maximum 5G impact on the meteorological sensing circuitry 42, such as the ATMS instrument and its data collection, depends on the type of non-geostationary satellite 40, but it is usually less than 5 to 10 seconds in many situations. For example, an ATMS satellite sensor on a JPSS satellite 40 has a passing sensor coverage over the Earth and passes a specific sensor coverage area on the Earth in about 2.7 seconds, corresponding to a coverage of about 2200 kilometers wide and 16 kilometers along a track. A 5G transmission null or power reduction for three along-track depths is sufficient to negate the interference impact. Three (3)×2.7 seconds corresponds to an 8.1 second, 5G impact. It is also possible to minimize the 5G interference impact in shorter time periods by multiples of right/left side sub-satellite points. For example, the cellular devices 22 on the left side of the coverage area may be turned "off" for 1.35 seconds, and the same cellular devices then turned "on" for 1.35 seconds, and that process repeated for three iterations. The same iterations could occur in a reduced power mode.

Also, as noted before, not all frequency bands operative as sensing channels on the ATMS instrument may be affected by 5G cellular transmissions. The plurality of cellular base stations 24 can be selective as to which 5G frequencies will be switched to a lower frequency or reduced in power. Possible interfering frequencies can be correlated with individual satellite ATMS sensor frequencies corresponding to the various ATMS instrument channels.

Density of the 5G cellular devices 22 and associated 5G transmissions vary greatly from location to location. For example, the aggregate 5G power levels in a rural area are much less than the aggregate 5G power in a densely populated city. Therefore, the allowable, individual 5G cellular power levels in a rural location, such as Montana, could be much greater than the allowable 5G cellular power levels in New York City when the satellite 40 is passing overhead. Population density maps for 5G cellular devices 22 may be taken into account when the cellular devices lower their 5G transmission power and the satellite 40 passes overhead.

The communications system 20 may take into account the time of day when considering the aggregated power levels of 5G cellular devices 22 if the power of the cellular devices is to be reduced. For example, even though New York City is a densely populated area, the number of active users of 5G cellular devices 22 will drop each night. The result is the aggregated 5G power during the night in New York City will be considerably less than aggregated 5G power in New York City during daytime hours, thus allowing individual cellular devices 22 to broadcast at a higher power level at night when the satellite 40 passes overhead. The communications system 20 may take these diurnal variations into account when scheduling the base station controller 30 and associated cellular devices 22 to lower their 5G power when the satellite 40 passes overhead.

Figure 2:
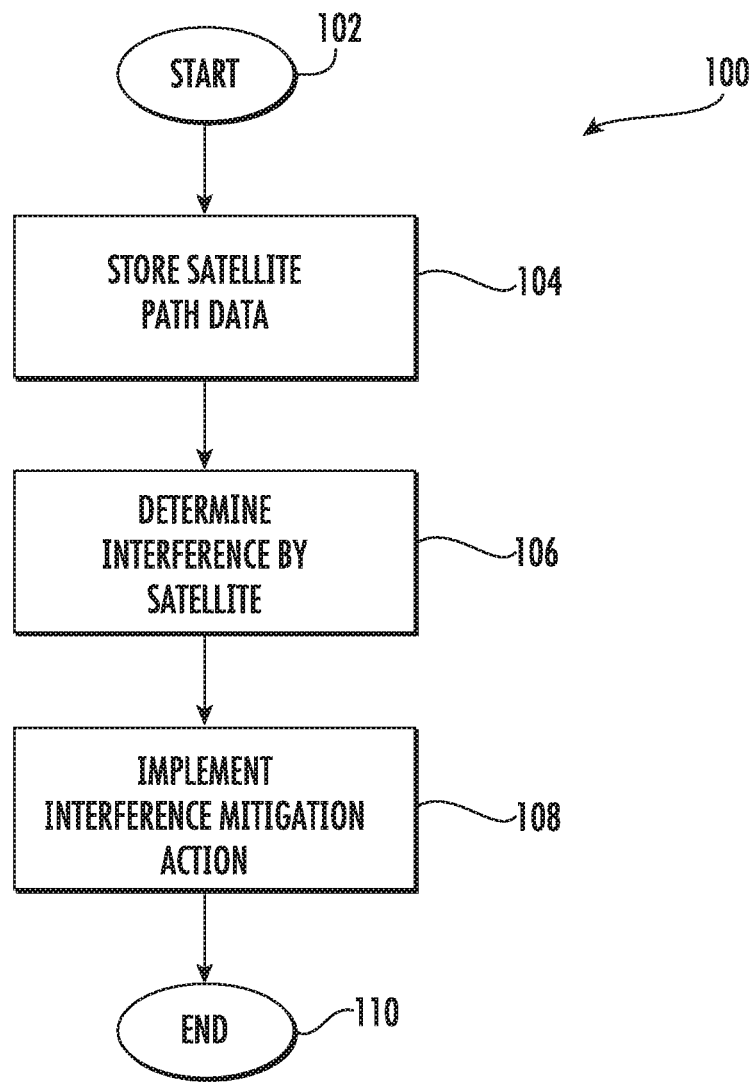
FIG. 2 is a high-level flowchart of a method for operating the cellular base station of FIG. 1.

Referring now to FIG. 2, there is illustrated a flowchart showing a sequence of steps that may be used for operating the communications system 20 as illustrated in FIG. 1, with the method indicated generally at 100. The process starts (Block 102) as the cellular base station controller 30 stores in its memory 30b satellite path data for the non-geostationary satellite 40 that is operable in a second frequency band, such as at 23.8 GHz, and susceptible to interference from the first frequency band, corresponding to the 5G 24.0 GHz band (Block 104). A determination is made when the satellite path data indicates interference would otherwise be experienced by the meteorological sensing circuitry 42 on the non-geostationary satellite 40 (Block 106). The cellular base station controller 30 implements an interference mitigation action in cooperation with associated cellular devices 22 based upon the satellite path data indicating interference would otherwise be experienced by the non-geostationary meteorological satellite 40 (Block 108). The process ends (Block 110).

Figure 3:
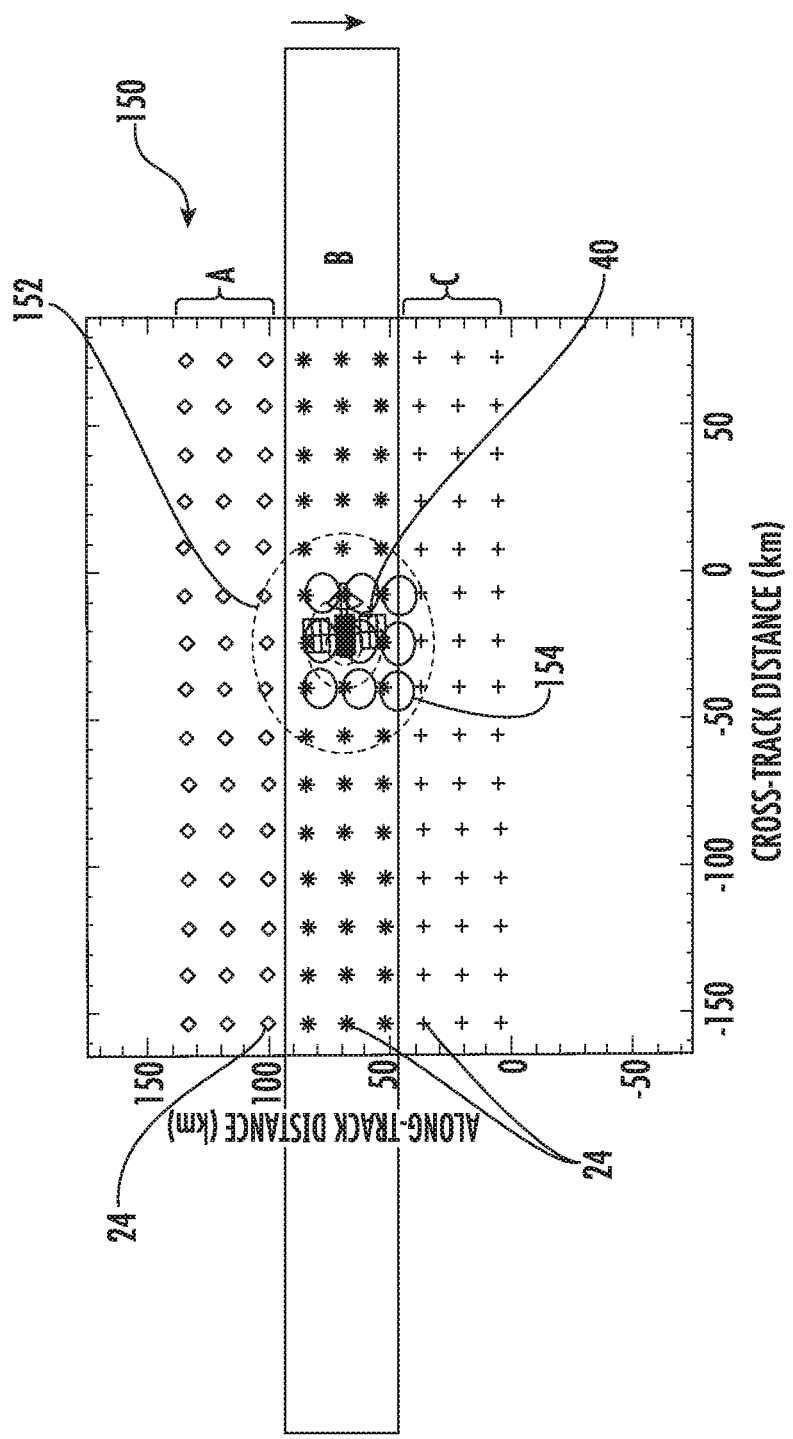
FIG. 3 is a graph illustrating a satellite passing over a region of Earth and an implemented mitigation action.

Referring now to FIG. 3, there is illustrated generally at 150 a graph of a portion of the Earth and showing the cross-track distance in kilometers on the horizontal axis and the along-track distance in kilometers on the vertical axis. Three zones of cellular base stations 24 are shown by the letters A, B and C, shown respectively by diamond, star, and plus symbols. The satellite 40 has passed the first zone A and is over a group of cellular base stations 24 in zone B, in which the cellular base stations 24 and cellular devices 22 in that area would influence the ATMS instrument sensors. Interference mitigation is implemented in cooperation with any associated cellular devices 22, such as reducing power of the cellular devices in the geographical area of base stations affecting the ATMS instrument, such as indicated by the dashed circle at 152. The smaller solid circles 154 indicate those respective base stations 24 that have instructed cellular devices 22 to reduce power. As the satellite continues its path in the direction from zone B to zone C, the first set of cellular base stations 24 located in zone C would instruct the cellular devices 22 to implement the interference mitigation action and reduce power, for example, and the process continues as the satellite passes over more cellular base stations 24.

The communications system 20 as described allows current, meteorological sensing circuits 42, such as on the ATMS instrument, to remain active on the satellite 40 and does not require modifications to those sensors. Minor software modifications may be made to existing cellular base stations 24 to implement the power reductions and time periods when power reductions are made. Software updates could correlate the satellite ephemeris with the location of various cellular base stations 24 and send information to cell carriers and tower operators as part of existing Network Management Systems (NMS). Different carriers could determine when power should be reduced on associated cellular devices 22 in a specific area or change operating parameters to an earlier generation of cellular technology, such as switching over to a 4G operation.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
    a plurality of cellular devices;
    a plurality of cellular base stations in communication with the plurality of cellular devices in a first frequency band; and
    a non-geostationary satellite comprising sensing circuitry operable in a second frequency band susceptible to interference from the first frequency band;
    each cellular base station comprising a controller and a transceiver cooperating therewith, the controller configured to
        store satellite path data for the non-geostationary satellite,
        determine when the satellite path data indicates interference would otherwise be experienced by the non-geostationary satellite, and
        implement an interference mitigation action in cooperation with associated cellular devices based upon the satellite path data indicating interference would otherwise be experienced by the non-geostationary satellite.

2. The communications system of claim 1 wherein the controller implements a mitigation action comprising causing a reduction of a transmit power of the associated cellular devices.

3. The communications system of claim 1 wherein the controller implements a mitigation action comprising causing a frequency change of the associated cellular devices.

4. The communications system of claim 1 wherein the controller implements a mitigation action comprising causing a change of the associated cellular devices to an earlier generation of cellular technology.

5. The communications system of claim 1 wherein the controller implements a mitigation action further based upon a geographic density of the associated cellular devices.

6. The communications system of claim 1 wherein the controller implements a mitigation action further based upon a time of day.

7. The communications system of claim 1 wherein the sensing circuitry of the non-geostationary satellite comprises meteorological sensing circuitry.

8. The communications system of claim 1 wherein the first frequency band is between 24.25 to 24.45 GHz.

9. The communications system of claim 1 wherein the second frequency band has a center frequency of 23.8 GHz and a total bandwidth of 0.27 GHz.

10. A cellular base station controller to cooperate with a cellular transceiver within a communications system comprising associated cellular devices, the cellular base station controller comprising:
    a processor and a memory cooperating therewith and configured to
        store satellite path data for a non-geostationary satellite comprising sensing circuitry operable in a second frequency band susceptible to interference from the first frequency band,
        determine when the satellite path data indicates interference would otherwise be experienced by the non-geostationary satellite, and
        implement an interference mitigation action in cooperation with associated cellular devices based upon the satellite path data indicating interference would otherwise be experienced by the non-geostationary satellite.

11. The cellular base station controller of claim 10 wherein the processor implements the mitigation action comprising causing a reduction of a transmit power of the associated cellular devices.

12. The cellular base station controller of claim 10 wherein the processor implements the mitigation action comprising causing a frequency change of the associated cellular devices.

13. The cellular base station controller of claim 10 wherein the processor implements the mitigation action comprising causing a change of the associated cellular devices to an earlier generation of cellular technology.

14. The cellular base station controller of claim 10 wherein the processor implements the mitigation action further based upon a geographic density of the associated cellular devices.

15. The cellular base station controller of claim 10 wherein the processor implements the mitigation action further based upon a time of day.

16. The cellular base station controller of claim 10 wherein the sensing circuitry of the non-geostationary satellite comprises meteorological sensing circuitry.

17. The cellular base station controller of claim 10 wherein the first frequency band is between 24.25 to 24.45 GHz; and wherein the second frequency band has a center frequency of 23.8 GHz and a total bandwidth of 0.27 GHz.

18. A method for operating a cellular base station comprising a cellular base station controller and a transceiver cooperating therewith and within a communications system comprising associated cellular devices, the method comprising:
    operating the cellular base station controller to
        store satellite path data for a non-geostationary satellite comprising sensing circuitry operable in a second frequency band susceptible to interference from the first frequency band,
        determine when the satellite path data indicates interference would otherwise be experienced by the non-geostationary satellite, and
        implement an interference mitigation action in cooperation with associated cellular devices based upon the satellite path data indicating interference would otherwise be experienced by the non-geostationary satellite.

19. The method of claim 18 wherein operating the cellular base station controller comprises operating the cellular base station controller to implement the mitigation action comprising causing a reduction of a transmit power of the associated cellular devices.

20. The method of claim 18 wherein operating the cellular base station controller comprises operating the cellular base station controller to implement the mitigation action comprising causing a frequency change of the associated cellular devices.

21. The method of claim 18 wherein operating the cellular base station controller comprises operating the cellular base station controller to implement the mitigation action comprising causing a change of the associated cellular devices to an earlier generation of cellular technology.

22. The method of claim 18 wherein operating the cellular base station controller comprises operating the cellular base station controller to implement the mitigation action further based upon a geographic density of the associated cellular devices.

23. The method of claim 18 wherein operating the cellular base station controller comprises operating the cellular base station controller to implement the mitigation action further based upon a time of day.

24. The method of claim 18 wherein the sensing circuitry of the non-geostationary satellite comprises meteorological sensing circuitry.

25. The method of claim 18 wherein the first frequency band is between 24.25 to 24.45 GHz; and wherein the second frequency band has a center frequency of 23.8 GHz and a total bandwidth of 0.27 GHz.

* * * * *